(12) United States Patent
Fodor et al.

(10) Patent No.: US 10,237,816 B2
(45) Date of Patent: Mar. 19, 2019

(54) INTEGRATED MULTI-RADIO ACCESS TECHNOLOGY MULTI-FREQUENCY ADMISSION CONTROL

(71) Applicant: Telefonaktiebolaget L M Ericsson (publ), Stockholm (SE)

(72) Inventors: Gabor Fodor, Hässelby (SE); Muhammad Kazmi, Bromma (SE); Iana Siomina, Täby (SE)

(73) Assignee: TELEFONAKTIEBOLAGET LM ERICSSON ( PUBL), Stockholm (SE)

( * ) Notice: Subject to any disclaimer, the term of this patent is extended or adjusted under 35 U.S.C. 154(b) by 727 days.

(21) Appl. No.: 14/546,848

(22) Filed: Nov. 18, 2014

(65) Prior Publication Data

US 2015/0078156 A1    Mar. 19, 2015

Related U.S. Application Data

(63) Continuation of application No. 13/133,819, filed as application No. PCT/SE2008/051433 on Dec. 10, 2008, now Pat. No. 9,008,671.

(51) Int. Cl.
*H04W 40/00*    (2009.01)
*H04W 48/18*    (2009.01)
(Continued)

(52) U.S. Cl.
CPC ........... *H04W 48/18* (2013.01); *H04L 47/726* (2013.01); *H04L 47/748* (2013.01);
(Continued)

(58) Field of Classification Search
CPC ...... H04L 12/5695; H04L 47/70–47/78; H04L 47/726; H04L 47/748; H04W 48/18;
(Continued)

(56) References Cited

U.S. PATENT DOCUMENTS

2011/0098036 A1    4/2011    Kröner et al.

FOREIGN PATENT DOCUMENTS

JP        2003274448 A    9/2003
WO        9405130 A1    3/1994
(Continued)

OTHER PUBLICATIONS

Furtenback, R-M., et al., "GSM and WCDMA—Common Network Approach," Ericsson Review No. 2, 2004, pp. 82-89, XP001224639.
(Continued)

*Primary Examiner* — Huy C Ho
(74) *Attorney, Agent, or Firm* — Coats & Bennett, PLLC

(57) ABSTRACT

A node of a multiple radio access technology (multi-RAT) system acquires resource status information associated with each RAT of the multi-RAT system. The resource status information of the RATs of the multi-RAT system can be acquired by sniffing higher layer protocol information pertaining to call setup requests and/or call terminated messages. The node further maintains a flag representing overall resource availability associated with the RATs of the multi-RAT system, based on the acquired resource status information, for use in admission control and/or load balancing. The flag is associated with a pre-defined set of overall resource availability states of the multi-RAT system, where the availability states are defined in terms of admission control decisions.

10 Claims, 13 Drawing Sheets

(51) Int. Cl.
　　　*H04L 12/911*　　　(2013.01)
　　　*H04W 28/02*　　　(2009.01)
　　　*H04W 28/08*　　　(2009.01)
　　　*H04W 48/06*　　　(2009.01)
　　　*H04W 88/06*　　　(2009.01)

(52) U.S. Cl.
　　　CPC ... *H04W 28/0247* (2013.01); *H04W 28/0289* (2013.01); *H04W 28/08* (2013.01); *H04W 48/06* (2013.01); *H04W 88/06* (2013.01)

(58) Field of Classification Search
　　　CPC ......... H04W 28/0247; H04W 28/0289; H04W 28/08; H04W 48/06; H04W 88/06
　　　USPC ........................................ 370/395.2; 455/448
　　　See application file for complete search history.

(56) References Cited

FOREIGN PATENT DOCUMENTS

| | | |
|---|---|---|
| WO | 03069938 A1 | 8/2003 |
| WO | 2005029900 A1 | 3/2005 |
| WO | 2005060294 A1 | 6/2005 |
| WO | 2007126352 A1 | 11/2007 |
| WO | WO2007/126352 * | 11/2007 |

OTHER PUBLICATIONS

NTT DOCOMO, "Unwanted emission requirements for multi-carrier BS with mixed channel bandwidths and mixed technologies," 3GPP R4-080971, 3GPP TSG RAN WG4 (Radio) Meeting #47, Kansas-City, MO, May 5, 2008, Agenda Item 6.1.4.2, pp. 1-3.

* cited by examiner

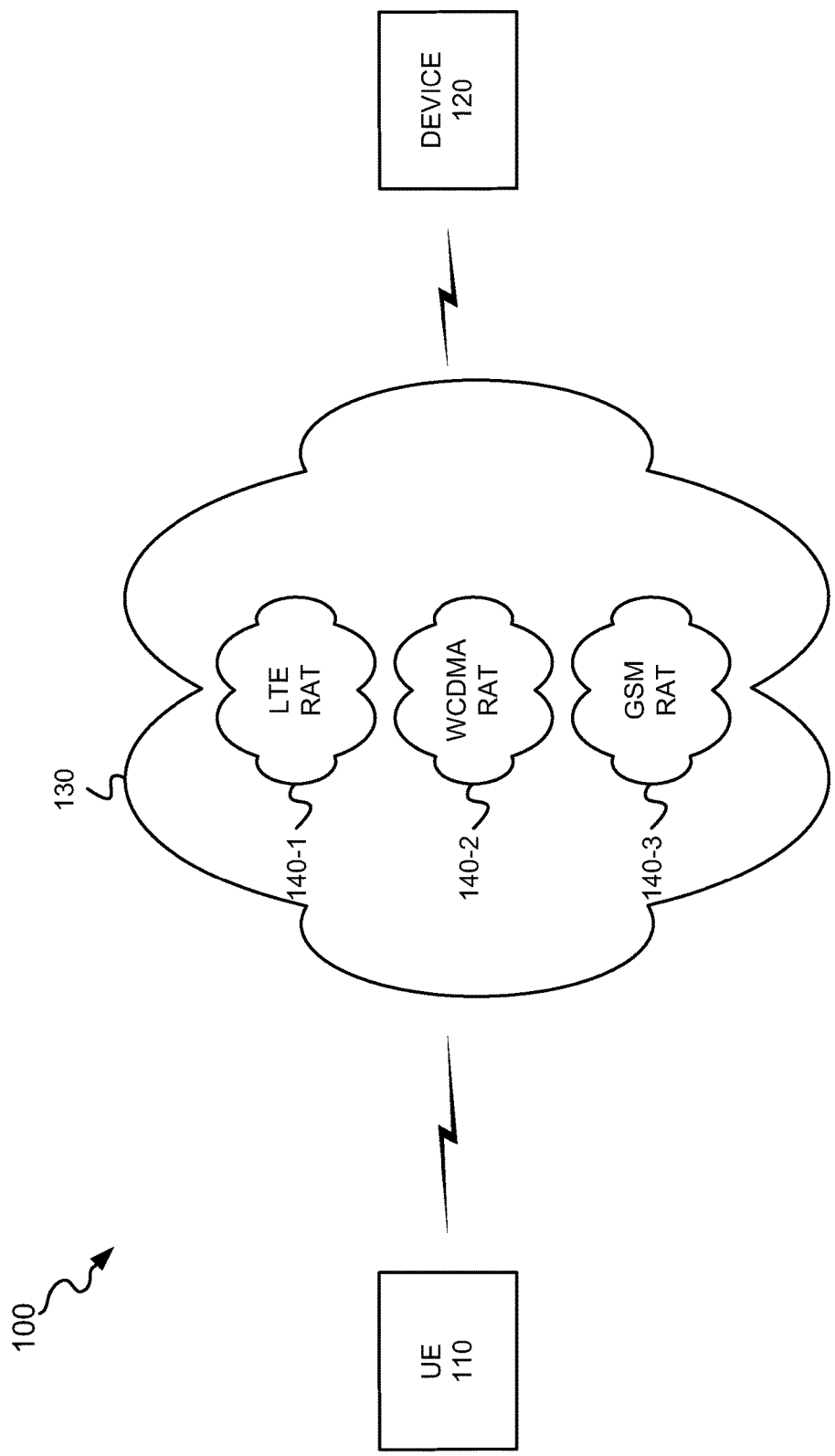

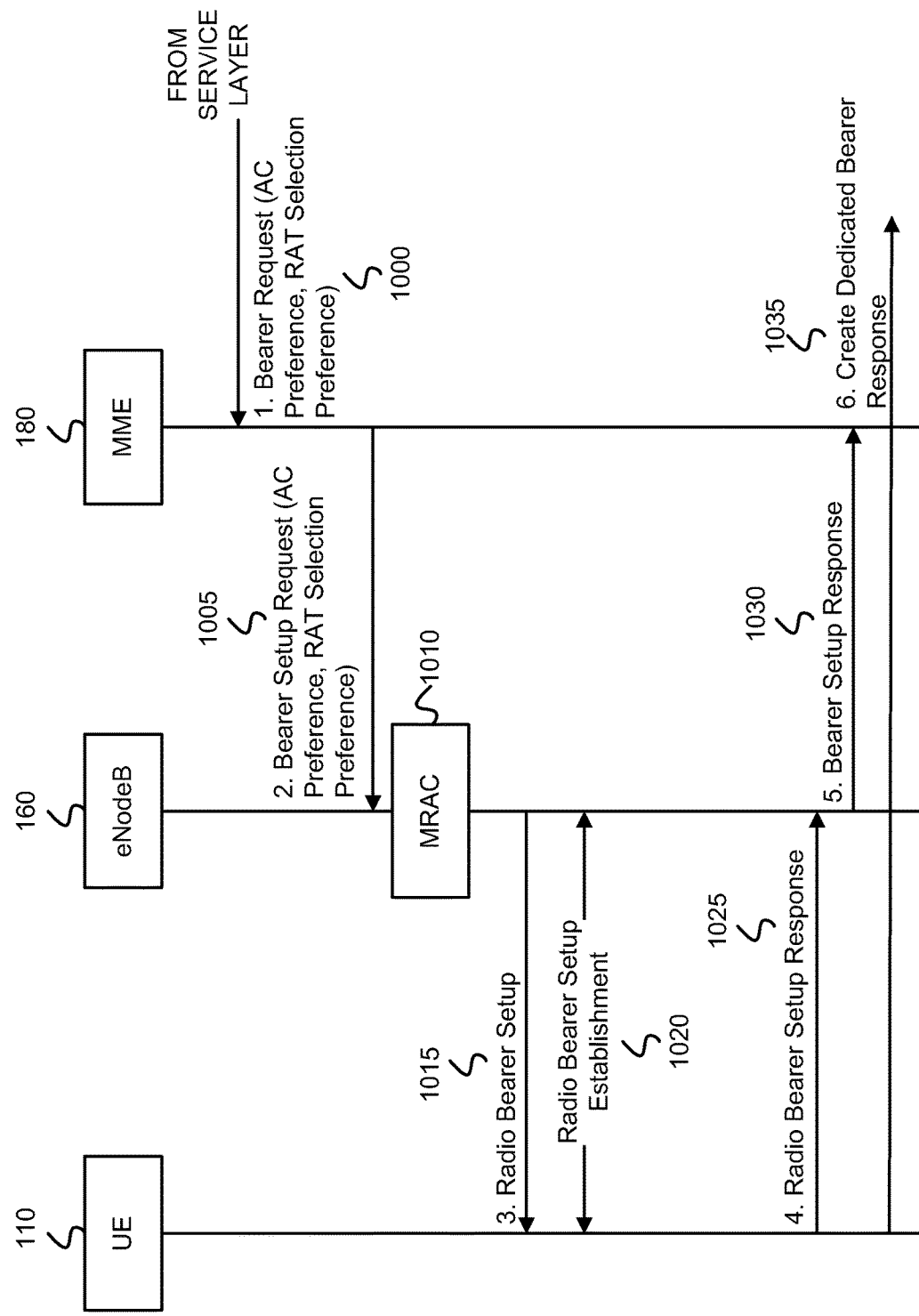

US 10,237,816 B2

INTEGRATED MULTI-RADIO ACCESS TECHNOLOGY MULTI-FREQUENCY ADMISSION CONTROL

RELATED APPLICATIONS

This application is a continuation of U.S. application Ser. No. 13/133,819, filed 9 Jun. 2011, which was the National Stage of International Application No. PCT/SE2008/051433, filed 10 Dec. 2008, the disclosures of each of which are incorporated herein by reference in their entirety.

TECHNICAL FIELD

Implementations described herein relate generally to radio access technology systems and, more particularly, to admission control in multi-radio access technology systems.

BACKGROUND

Admission control (AC) is a well-known and widely used radio resource management (RMM) function in a wide range of wireless access networks, including the Global Standard for Mobile (GSM) communications, the Generalized Packet Radio Service (GPRS), the Enhanced Data for GSM Evolution (EDGE), the wide-band code division multiple access (WCDMA) and the evolved Universal Terrestrial Radio Access (E-UTRA) wireless access networks. In general, admission control has the task to admit or reject a service request based on the available resources at the time of the service request and the resources that are needed to ensure proper quality for the particular service. For example, for WCDMA networks, admission control takes into account multi-cell radio resources rather than basing the admission control on the state of a single radio cell.

The capacity of wireless networks that include multiple radio access technologies (RATs) is a closely related and well-studied area. Multi-RAT networks are often characterized by an associated capacity region that jointly characterizes the number of different services that can be accommodated by the multi-RAT system.

Load balancing is a radio resource management (RRM) technique that is often used in multi-RAT networks. The purpose of load balancing is to assign or re-assign radio access technologies to in-progress sessions such that the overall radio resources are well utilized and thereby the overall capacity of the multi-RAT system is maximized under some quality of service or other constraint(s).

A well-known trade off in wireless networks, which is closely related to admission control, occurs between the blocking of newly arriving service requests and the dropping of on-going services. This trade off can be expressed as, the higher the number of in-progress sessions there is, there is an increased likelihood that some services need to be dropped due to insufficient resources or outages. At an extreme case, systems without any admission control are feasible as long as it is acceptable that certain sessions might need to be terminated prematurely in order to ensure system stability and maintain some service quality for non-dropped sessions.

The $3^{rd}$ Generation Partnership Project (3GPP) is currently finalizing Release 8 of the Long Term Evolution (LTE) standards suite. LTE networks are expected to be deployed in the coming years by incumbent as well as green-field operators. As such, it is expected that LTE systems will often be deployed as part of an operating multi-access infrastructure. In such situations, the LTE radio access equipments will typically be integrated into operating with GSM/GPRS/EDGE/WCDMA systems.

There are two possible arrangements according to which a LTE base station can be deployed in conjunction with other RATs: co-located base stations and base stations with mixed technologies. With co-located base stations, LTE system requirements are co-located with the equipments of other RATs, possibly sharing some parts of the existing site infrastructure including power supply, transport networks, cellular tower, etc. In this type of deployment scenario, the set of equipment of each RAT is independent, although there can be some coordination on the level of various protocol layers.

With base stations having mixed technologies, the radio equipment used by the base stations are commonly used by all RATs (e.g., LTE, UTRAN, GSM, etc.). It might also be possible to share the base band processing part of the equipment. However, the higher layers operate independently. The primary benefit of a mixed technology base station is that it is cost efficient due to the use of only a single radio part. This quasi-integrated solution also makes the overall base station more compact and power efficient thereby also reducing the operating cost of network and site maintenance. Presently, the mixed technology base station is undergoing a rudimentary phase of standardization in various standardization bodies, which include GERAN and 3GPP RAN4.

SUMMARY

Exemplary embodiments described herein provide a technique for performing admission control in a multi-RAT system that takes into account an overall system traffic load across all of the RATs of the multi-RAT system. In exemplary embodiments, cross-layer cross-RAT communication may be used to determine and aggregate load information across the RATs of the multi-RAT system. A global flag may be set, based on the determined overall load information, and used for multi-RAT admission control (MRAC) decisions with respect to future service requests associated with UEs requesting service access. Use of the global flag, as described herein, enables a service request arriving at a RAT of the multi-RAT system to be admitted regardless of the service requirement as long as there are sufficient resources in the overall system. Therefore, the RAT receiving the service request may not need to execute any admission control even if the free resources in the RAT alone would normally make it necessary to examine the service request and make an assessment whether the service request can be executed or not.

According to one aspect, a method implemented in a node of a multi-radio access technology (RAT) system may include acquiring resource status information associated with each RAT of the multi-RAT system. The method may further include maintaining a flag representing overall resource availability associated with the RATs of the multi-RAT system, based on the acquired resource status information, for use in admission control and/or load balancing.

According to a further aspect, a node in a multiple radio access technology (multi-RAT) system may include a resource status acquisition unit to acquire resource status information associated with each RAT of the multi-RAT system and a flag maintenance unit to maintain a flag representing resource availability associated with multiple RATs of the multi-RAT system based on the acquired resource status information. The node may further include one or more units to perform admission control for system access requests, or to perform load balancing of system access requests across the RATs of the multi-RAT system, based on contents of the flag.

BRIEF DESCRIPTION OF THE DRAWINGS

The accompanying drawings, which are incorporated in and constitute a part of this specification, illustrate one or more embodiments of the present disclosure and, together with the description, explain the present disclosure. In the drawings:

FIG. 1B illustrates an exemplary implementation of the network of FIG. 1A, where the multi-RAT system includes an LTE RAT, a WCDMA RAT and a GSM RAT;

FIG. 10 is an exemplary messaging diagram associated with the exemplary process of FIG. 9.

DETAILED DESCRIPTION

Figure 1A:
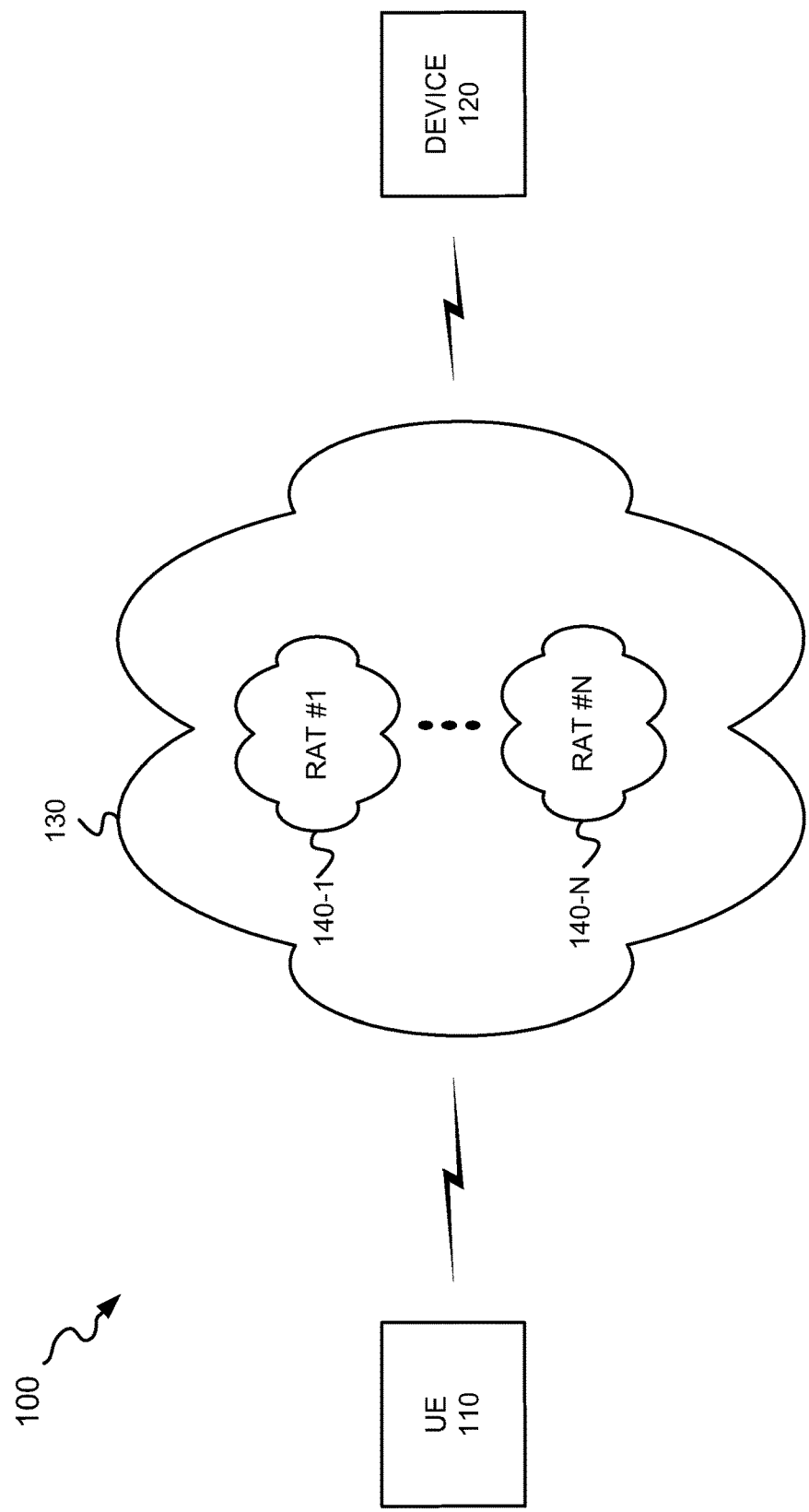
FIG. 1A illustrates an exemplary environment in which a user equipment may communicate with another device via a network(s) that includes a multi-RAT system.

The following detailed description refers to the accompanying drawings. The same reference numbers in different drawings may identify the same or similar elements. Also, the following detailed description does not limit the present disclosure.

In a multi-RAT system, a service access request can be granted as long as there is a sufficient amount of resources for the service available in the entire system. An admission decision granting the service access should be based on an up-to-date resource estimation and, therefore, resource availability estimates need to be made available with minimal delay and signaling overhead. A multi-RAT admission control (MRAC) system should be able to achieve the following:

1) ensure service quality for on-going and newly accepted sessions;
2) minimize call blocking probability (e.g., avoiding false reject decisions);
3) minimize call/session drops (e.g., avoiding false accept decisions);
4) ensure a low delay between a service request and an admission control decision;
5) take into account user service class (e.g., subscription), service characteristics (e.g., GBR/non-GBR), user preferences with respect to blocking/dropping rates, and preferred RAT (if any); and
6) make efficient use of overall radio and other radio network resources.

In addition to the requirements listed above, the MRAC procedure should remain as low complexity as possible and preferably should not assume a centralized multi-RAT entity to avoid new physical network elements, reduce signaling overhead and avoid the need for standardizing new interfaces or protocols or signaling messages.

Exemplary embodiments described herein satisfy the above-noted requirements by maintaining a single flag that indicates whether the overall multi-RAT system is such that admission control in one of the RATs (e.g., the LTE system) does not have to be exercised at all. Thus, exemplary embodiments may avoid using admission control as long as possible in order to simplify the service setup and to ensure low delay. A service request arriving at one of the RATs (e.g., the LTE RAT) may be admitted irrespective of the service requirement as long as there are sufficient resources in the overall multi-RAT system. Therefore, a RAT receiving a service request (e.g., the LTE system) may not need to execute any admission control procedure even if the free resources in the one RAT alone would make it necessary to examine the service request and make an assessment whether the service request can be executed or not. Exemplary embodiments facilitate the elimination of admission control by a flag that aggregates overall current load information. The flag may be maintained in a "main" RAT (e.g., the LTE RAT) of the multi-RAT system using cross-layer cross-RAT communication. A measurement based MRAC for the entire multi-RAT system may take into account the amount of resources available in the entire system and consider service requirements and user preferences. The resource availability information may be maintained in the flag stored in one of the system RATs (e.g., the main RAT). The flag may be used when determining resource availability and when exercising MRAC for service access requests.

In further implementations described herein, a UE preference regarding whether the UE prefers to go through MRAC may be sent with the service request that requests system service for the UE. The UE preference may indicate whether the UE prefers to undergo admission control or not. Additionally, a RAT selection preference may be sent within the service request that requests system service for the UE. The RAT selection preference may indicate whether RAT re-selection is acceptable for the service request or not. The determination of whether to perform MRAC for the service request, or whether to perform RAT selection/re-selection, may be based on the MRAC preference or the RAT selection preference.

The terms "communication system" and "network" may be used interchangeably throughout this description. The term "RAT" is intended to be broadly interpreted to include any type of wireless access technology. For example, the wireless access technology may be based on a radio access technology (e.g., General Packet Radio Service (GPRS), LTE, GSM, etc.), a microwave access technology (e.g., Bluetooth, Worldwide Interoperability for Microwave Access (WiMAX), Institute of Electrical and Electronic Engineering (IEEE) 802.X, etc.), and/or a satellite access technology.

FIG. 1A illustrates an exemplary environment 100 in which a user equipment (UE) 110 may communicate with another device 120 via a network(s) 130. Network(s) 130 may include one or more networks of any type, including, for example, a local area network (LAN); a wide area network (WAN); a metropolitan area network (MAN); a telephone network, such as a PSTN or a PLMN; a satellite network; an intranet, the Internet; or a combination of networks. The PLMN(s) may further include a packet-switched sub-network, such as, for example, a General Packet Radio Service (GPRS) network, a Cellular Digital Packet Data (CDPD) network, or a Mobile IP network. As shown in FIG. 1A, network(s) 130 may include a multi-RAT system that includes multiple, different RATs, including RATs 140-1 through 140-N. One or more of RATs 140-1 through 140-N may be used by UE 110 for communicating with device 120. Each of RATs 140-1 through 140-N may include, for example, an evolved Universal Mobile Telecommunications System Terrestrial Access Network (E-UTRAN) FDD RAT, an E-UTRAN Time Divisional Duplexing (TDD) RAT, a Wide Band Code Division Multiple Access (WCDMA) RAT, an advanced E-UTRAN TDD RAT, an advanced E-UTRAN Frequency Division Duplexing (FDD) RAT, a UTRAN TDD RAT, a high rate packet data (HRPD) RAT, a Global System for Mobile Communications (GSM) RAT, a cdma2000 RAT, or other types of RATs. In some exemplary implementations, one of RATs 140-1 through 140-N may serve as a "main" RAT in which one of the nodes of the main RAT may maintain a flag that indicates an overall status of resources in the multi-RAT system.

UE 110 may include a cellular radiotelephone, a personal digital assistant (PDA), a Personal Communications System (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. UE 110 may be referred to as a "pervasive computing" device.

Device 120 may include a similar device to UE 110 and, in some implementations, may additionally include a telephone (e.g., Plain Old Telephone system (POTs) telephones) that is connected to a Public Switched Telephone Network (PSTN).

FIG. 1B depicts an exemplary implementation of network (s) 130 in which RAT 140-1 includes an LTE RAT, RAT 140-2 includes a WCDMA RAT and RAT 140-3 includes a GSM RAT. LTE RAT 140-1 may include a Long Term Evolution RAT. WCDMA RAT 140-2 may include a Wideband Code Division Multiple Access RAT. GSM RAT 140-3 may include a Global System for Mobile communications RAT. Network(s) 130 may include different, additional, and/or fewer RATs than those shown in FIG. 1B.

Figure 1C:
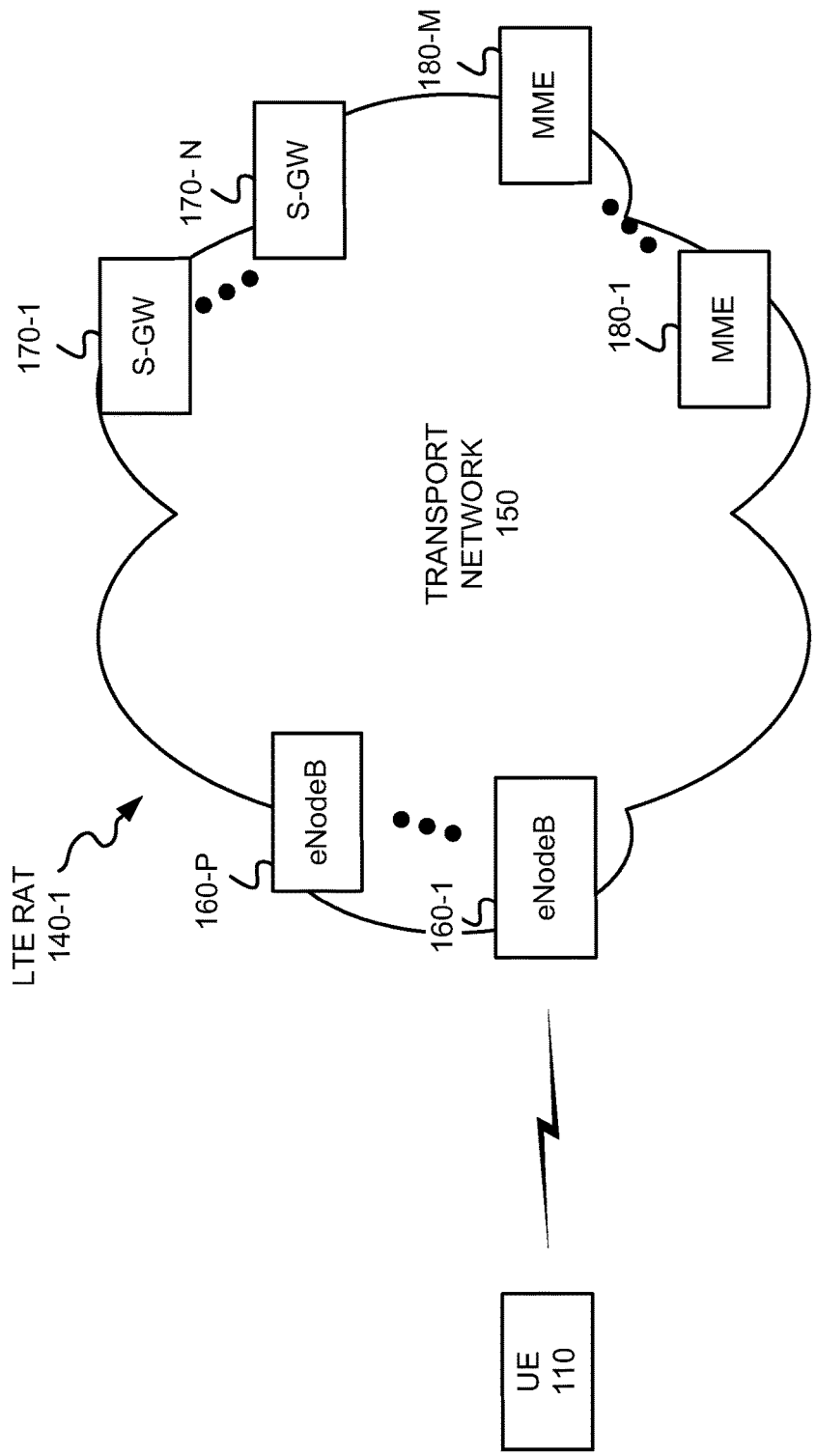
FIG. 1C illustrates exemplary details of the LTE RAT of FIG. 1B.

FIG. 1C illustrates exemplary details of LTE RAT 140-1 of network 130. LTE RAT 140-1 may include evolved NodeB (eNodeB) nodes, Mobility Management Entity (MME) nodes, and Serving Gateway (S-GW) nodes, all connected to a transport network 150. As depicted in FIG. 1C, LTE RAT 140-1 may include eNodeBs 160-1 through 160-P, S-GWs 170-1 through 170-N and MMEs 180-1 through 180-M. eNodeBs 160-1 through 160-P may include LTE base station nodes that serve as intermediate nodes for UEs communicating with other devices. For example, FIG. 1C depicts eNodeB 160-1 serving as an intermediate node for UE 110 to communicate with another node (not shown). ENodeBs 160-1 through 160-P may communicate with UEs via a wireless interface and may then transfer those communications towards a destination node or device (e.g., towards device 120) via transport network 150.

S-GWs 170-1 through 170-N may include logical nodes that terminate UE connections (called "EPS bearers" in 3GPP terminology). An EPS bearer may include a connection provided by the SAE/LTE system in between the UE and the outside network (e.g., the Internet). S-GWs 170-1 through 170-N may additionally each include Packet Data Network Gateway (P-GW) functionality and the P-GW may allocate an IP address to the UE to provide the connection between the UE and the outside network.

MMEs 180-1 through 180-M may each include functionality for handling UE mobility within environment 100. For example, MME 180-1 may serve UE 110 and MME 180-M may serve another UE (not shown).

Transport network 150 may include one or more networks of any type, including, for example, a local area network (LAN); a wide area network (WAN); a metropolitan area network (MAN); a satellite network; an intranet, the Internet; or a combination of networks. eNodeBs 160-1 through 160-P, S-GWs 170-1 through 170-N, and MMEs 180-1 through 180-M may reside in an SAE/LTE network and may be connected via transport network 150.

Two possible arrangements may be used for deploying multiple RATs in environment 100: 1) co-located base stations, each having a different RAT; or 2) a single base station having mixed RAT technologies. With co-located base stations, LTE system requirements may be co-located with the equipments of other RATs, possibly sharing some parts of the existing site infrastructure including power supply, transport networks, cellular tower, etc. In this type of deployment scenario, the set of equipment of each RAT may be independent, though there may be some coordination on the level of various protocol layers. In this approach, a new RAT can be easily added or an existing one can be removed or replaced by another one.

With single base stations having mixed RAT technologies, the radio equipment used by the base stations may commonly be used by all RATs (e.g., LTE, UTRAN, GSM, etc.). It might also be possible to share the base band processing part of the equipment. However, the higher layers may operate independently. The primary benefit of a mixed RAT base station is that it is cost efficient due to using only a single radio portion. This quasi-integrated solution also makes the overall base station more compact and power efficient thereby also reducing the operating cost of network and site maintenance.

Figure 2A:
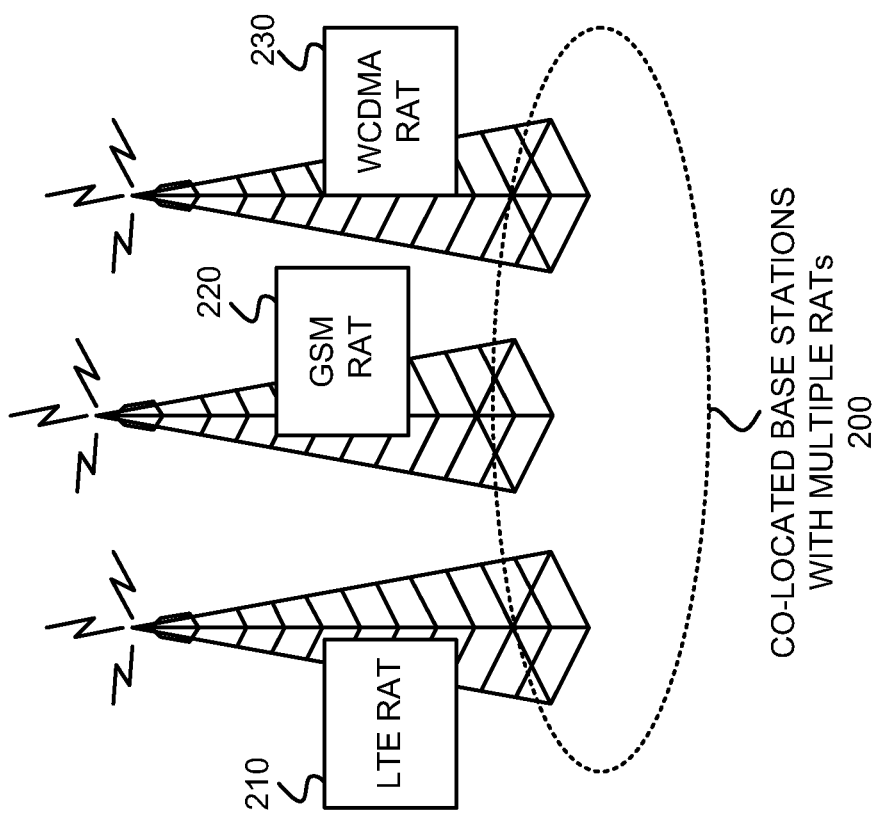
FIG. 2A depicts co-located base stations having multiple RATs in the exemplary implementation of FIG. 1B.

FIG. 2A depicts co-located base stations 200 having multiple RATs. Each of the co-located base stations 200 of FIG. 2A may include a different type of RAT. For example, as shown in FIG. 2A, co-located base stations 200 may include a base station deploying an LTE RAT 210, a base station deploying a GSM RAT 220 and/or a base station deploying WCDMA RAT 230. Co-located base stations 200 may be located within close geographic proximity to one another.

Figure 2B:
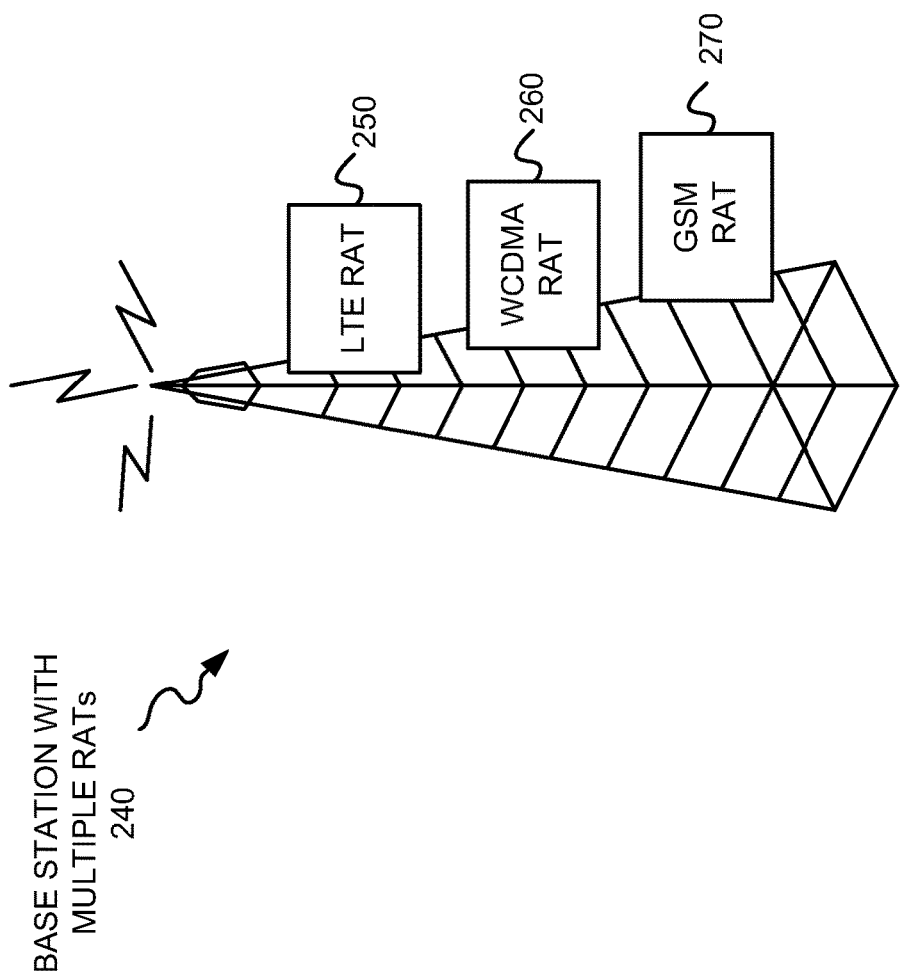
FIG. 2B depicts a single base station that deploys multiple RATs in the exemplary implementation of FIG. 1B.

FIG. 2B depicts a single base station 240 that deploys multiple RATs. As shown in the illustrative example of FIG. 2B, base station 240 may deploy an LTE RAT 240, a WCDMA 260 and/or a GSM RAT 270. Deploying multiple RATs within a single base station, as shown in FIG. 2B, permits the use of integrated radio equipment (i.e., the same radio equipment may be used by all of the different RATs) and, additionally, permits the use of combined radio resource management (RRM) techniques such as, for example, admission control. The use of combined RRM techniques enables the system operator to make efficient use of overall radio resources in base stations having mixed RATs. Base station 240 may, for example, include an eNodeB.

Figure 3:
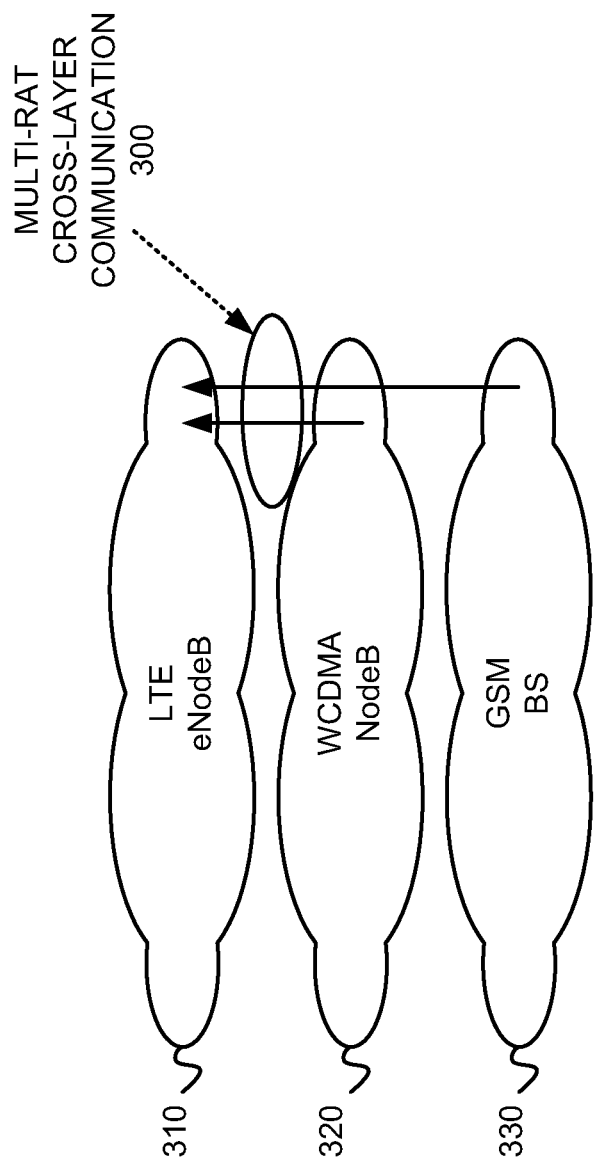
FIG. 3 depicts an exemplary implementation in which cross-layer communication may be used to collect resource status information in a radio base station of a main RAT of the network of FIG. 1B.

When multiple RATs are deployed at co-located base stations 200, shown in FIG. 2A, or at a single base station 240, shown in FIG. 2B, multi-RAT cross-layer communication 300 may be used, as illustrated in FIG. 3, to enable the acquisition of the overall resource status information among the different RATs. In a multi-RAT system with co-located cells, the resource status information, such as, for example, number of active users, active radio bearers, active sessions, etc., may be available in different nodes. Such nodes may include, for example, BSC/CN for GSM, RNC/CN for UTRAN, BSC/CN for cdma2000, and eNodeB/CN for E-UTRAN. Even in the case of a single base station deploying multiple different RATs, the resource status information may reside in different nodes because of independent higher protocol layers. In exemplary embodiments described herein, cross-layer communication 300 may be used to acquire resource status information from each of the different RATs. FIG. 3 depicts an exemplary implementation in which cross-layer communication 300 may be used to collect resource status information in a radio base station of the main RAT. For example, as shown in FIG. 3, an LTE eNodeB 310 may collect resource status information from a WCDMA NodeB 320 and/or a GSM base station 330. The resource status information may be obtained from different layers (e.g., RRC or NAS) by reading different protocols (e.g., SIP, RTP, etc.). Based on the collected resource status information, MRAC for the entire multi-RAT system may be exercised by, for example, the LTE eNodeB 310.

The resource status information acquired via multi-RAT cross layer communication 300 may include a total number of active sessions, calls or active radio bearers in each RAT. This information may be acquired by tracking (e.g., "sniffing") higher layer protocol information related to call setup requests and call terminated messages, such as, for example, SIP signaling. Such messages for each RAT may traverse a corresponding base station and can be read by cross-layer examination. During cross-layer examination, packets of a certain protocol layer (e.g., SIP) may be inspected and relevant information may be fed to another protocol layer (e.g., MAC). This cross-layer communication can take place in any direction (i.e., from higher layer to lower layer or vice versa).

For example, a total number of active calls at any time in one RAT can be estimated by tracking all new call requests ($N_{request}$) and call releases ($N_{release}$). Therefore, at any time $T_1$, the number of active calls ($N_{active}$) in a RAT may be expressed by the following expression:

$$N_{active}(T_1) = N_{active}(T_0) + N_{request}(\Delta t) - N_{release}(\Delta t)$$

where $\Delta t = T_1 - T_0$

The number of active calls may be tracked and maintained per service type, such as, for example, service types including narrow band, broadband, real time, non-real time, etc. Similarly, other performance parameters (e.g., a number of active sessions or radio bearers) may be tracked. The resource status information acquired via multi-RAT cross layer communication 300 may further include an aggregate number of call setup requests and/or an aggregate number of call terminated messages in each of the RATs, a number of call setup requests per service type and/or a number of call terminated messages per service type in each of the RATs, or a number of call setup requests per radio bearer type and/or a number of call terminated messages per radio bearer type in each of the RATs.

Figure 4:
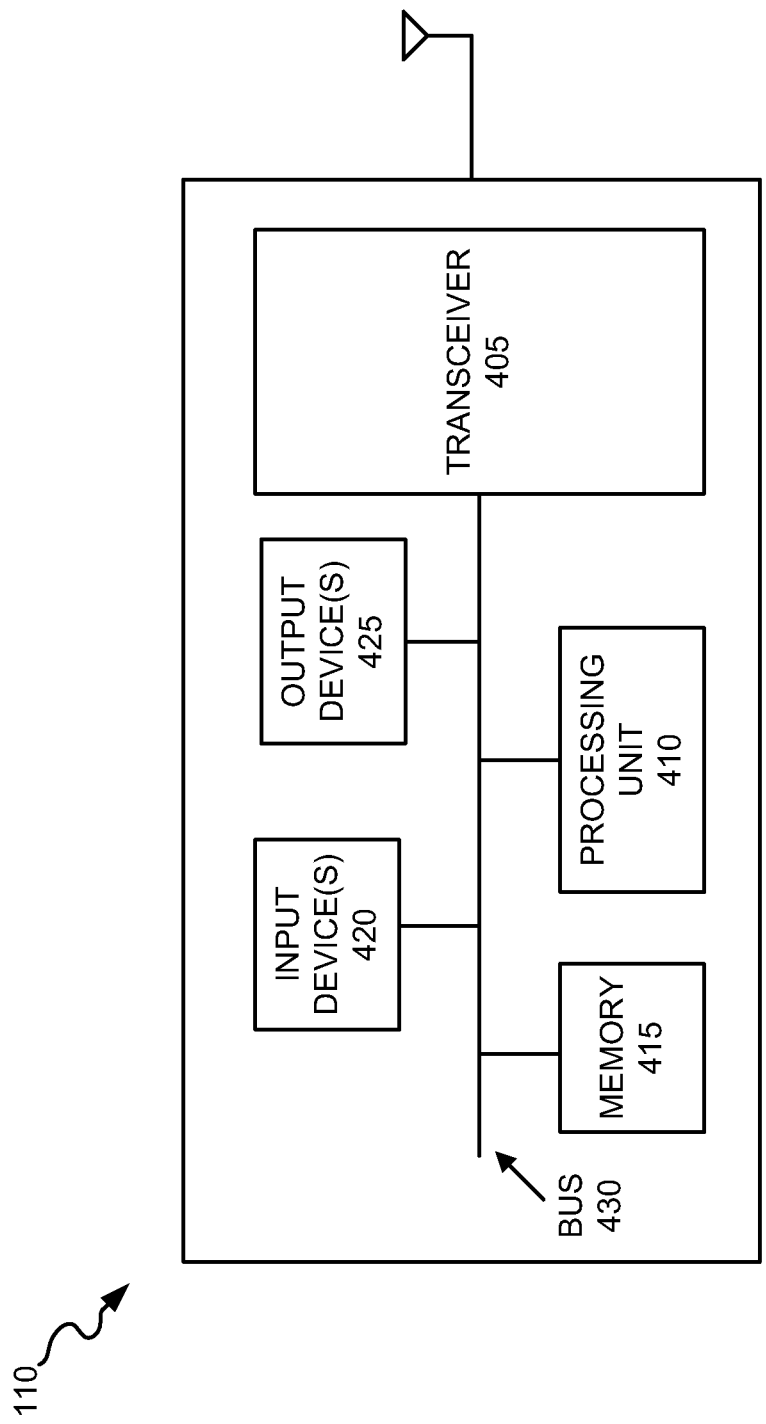
FIG. 4 illustrates exemplary components of the UE of FIG. 1A.

FIG. 4 illustrates exemplary components of UE 110. UE 110 may include a transceiver 405, a processing unit 410, a memory 415, an input device(s) 420, an output device(s) 425, and a bus 430.

Transceiver 405 may include transceiver circuitry for transmitting and/or receiving symbol sequences using radio frequency signals via one or more antennas. Processing unit 410 may include a processor, microprocessor, or processing logic that may interpret and execute instructions. Processing unit 410 may perform all data processing functions for inputting, outputting, and processing of data including data buffering and UE control functions, such as call processing control, user interface control, or the like.

Memory 415 may provide permanent, semi-permanent, or temporary working storage of data and instructions for use by processing unit 410 in performing device processing functions. Memory 415 may include ROM, RAM, large-capacity storage devices, such as a magnetic and/or optical recording medium and its corresponding drive, and/or other types of memory devices. Input device(s) 420 may include mechanisms for entry of data into UE 110. For example, input device(s) 420 may include a key pad (not shown), a microphone (not shown) or a display unit (not shown). The key pad may permit manual user entry of data into UE 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker (not shown) that includes mechanisms for converting electrical signals into auditory output. Output device(s) 425 may further include a display unit that displays output data to the user. For example, the display unit may provide a graphical user interface that displays output data to the user. Bus 430 may interconnect the various components of UE 110 to permit the components to communicate with one another.

The configuration of components of UE 110 illustrated in FIG. 4 is for illustrative purposes only. Other configurations with more or fewer components, or a different arrangement of components may be implemented.

Figure 5:
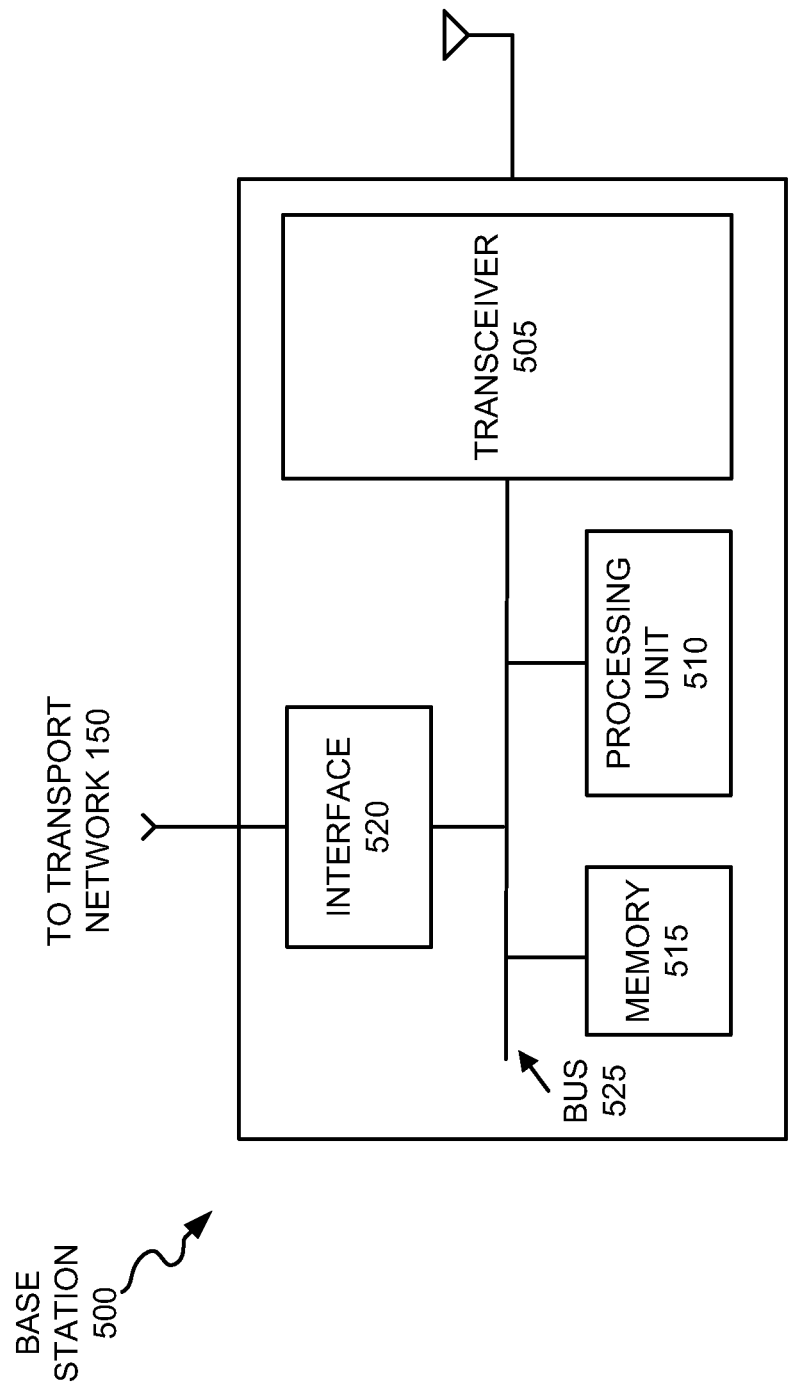
FIG. 5 illustrates an exemplary implementation of a base station that may correspond to an eNodeB of FIG. 1C.

FIG. 5 illustrates an exemplary implementation of a base station 500 that may correspond, for example, to an eNodeB 160 of FIG. 1C. Base station 500 may include a transceiver 505, a processing unit 510, a memory 515, an interface 520 and a bus 525.

Transceiver 505 may include transceiver circuitry for transmitting and/or receiving symbol sequences using radio frequency signals via one or more antennas. Processing unit 510 may include a processor, a microprocessor, or processing logic that may interpret and execute instructions. Processing unit 510 may perform all device data processing functions. Memory 515 may provide permanent, semi-permanent, or temporary working storage of data and/or instructions for use by processing unit 510 in performing device processing functions. Memory 515 may include read only memory (ROM), random access memory (RAM), large-capacity storage devices, such as a magnetic and/or optical recording medium and its corresponding drive, and/or other types of memory devices. Interface 520 may include circuitry for interfacing with a link that connects to an external network, such as, for example, transport network 150. Bus 525 may interconnect the various components of base station 500 to permit the components to communicate with one another.

The configuration of components of base station 500 illustrated in FIG. 5 is for illustrative purposes only. Other configurations with more or fewer components, or a different arrangement of components may be implemented.

Figure 6:
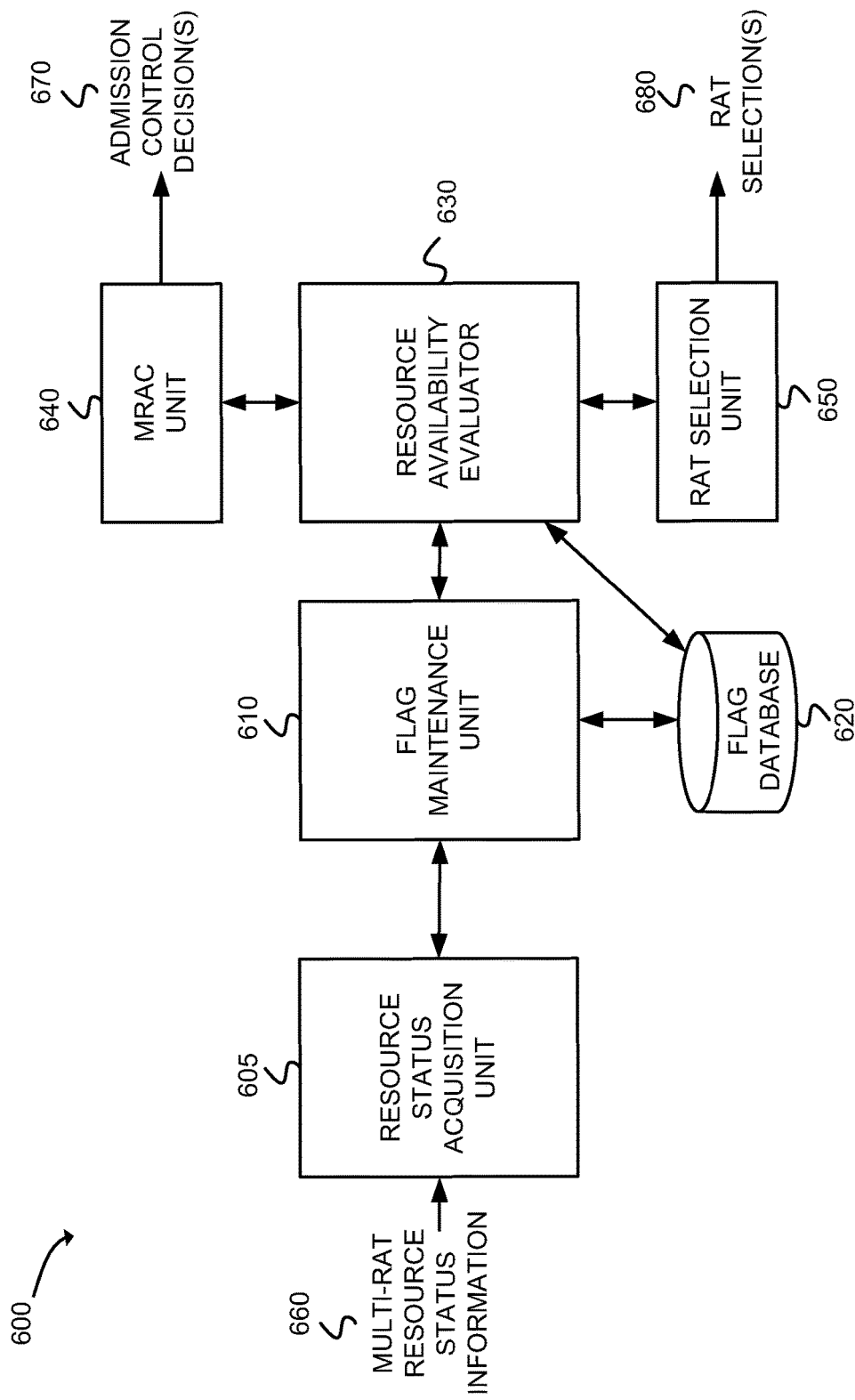
FIG. 6 depicts functional components of a RAT node that may correspond to an eNodeB of the LTE RAT of FIG. 1B.

FIG. 6 depicts functional components of a RAT node 600 that may correspond, for example, to an eNodeB 160 of LTE RAT 140-1. RAT node 600 may, therefore, correspond to a node in the main RAT of network(s) 130. In other implementations, RAT node 600 may correspond to other nodes in LTE RAT 140-1, or to nodes in other RATs (e.g., WCDMA RAT or GSM RAT). RAT node 600 may include a resource status acquisition unit 605, a flag(s) maintenance unit 610, a flag(s) database 620, a resource availability evaluator 630, a multi-RAT admission control (MRAC) unit 640, and a RAT selection unit 650.

Resource status acquisition unit 605 may obtain multi-RAT resource status information from RATS (e.g., RATs 140-1 through 140-N of FIG. 1A). Such resource status information may include, but is not limited to, a total number of active sessions or calls in each RAT, a number of active radio bearers in each RAT, a number of active calls per service type in each RAT (e.g., narrow band service, broadband service, real time service, non-real time service, etc.), an aggregate number of call setup requests in each RAT, an aggregate number of call terminated messages in each RAT, a number of call setup requests per service type in each RAT, or a number of call terminated messages per service type in each RAT.

Flag maintenance unit 610 may determine and maintain an N-bit global flag indicating an overall resource situation of the multi-RAT system. In some implementations, flag maintenance unit 610 may also maintain local flags that indicate a resource situation of each single RAT of the multi-RAT system. The global flag and local flags are further described below with respect to FIG. 7. Flag database 620 may store the global flag and/or local flag(s) determined by flag maintenance unit 610.

Resource availability evaluator 630 may retrieve the global flag and/or local flag(s) from flag database 620 and may use the retrieved flag(s) as a basis for determining overall resource availability across the multiple RATs 140-1 through 140-N. MRAC unit 640 may use the overall resource availability across the multiple RATs, determined by resource availability evaluator 630, to make a decision whether to perform, or not to perform, multi-RAT admission control. RAT selection unit 650 may use the overall resource availability across the multiple RATs, determined by evaluator 630, to select a RAT from the multiple RATs 140-1 through 140-N to service a particular UE's service request.

Figure 7:
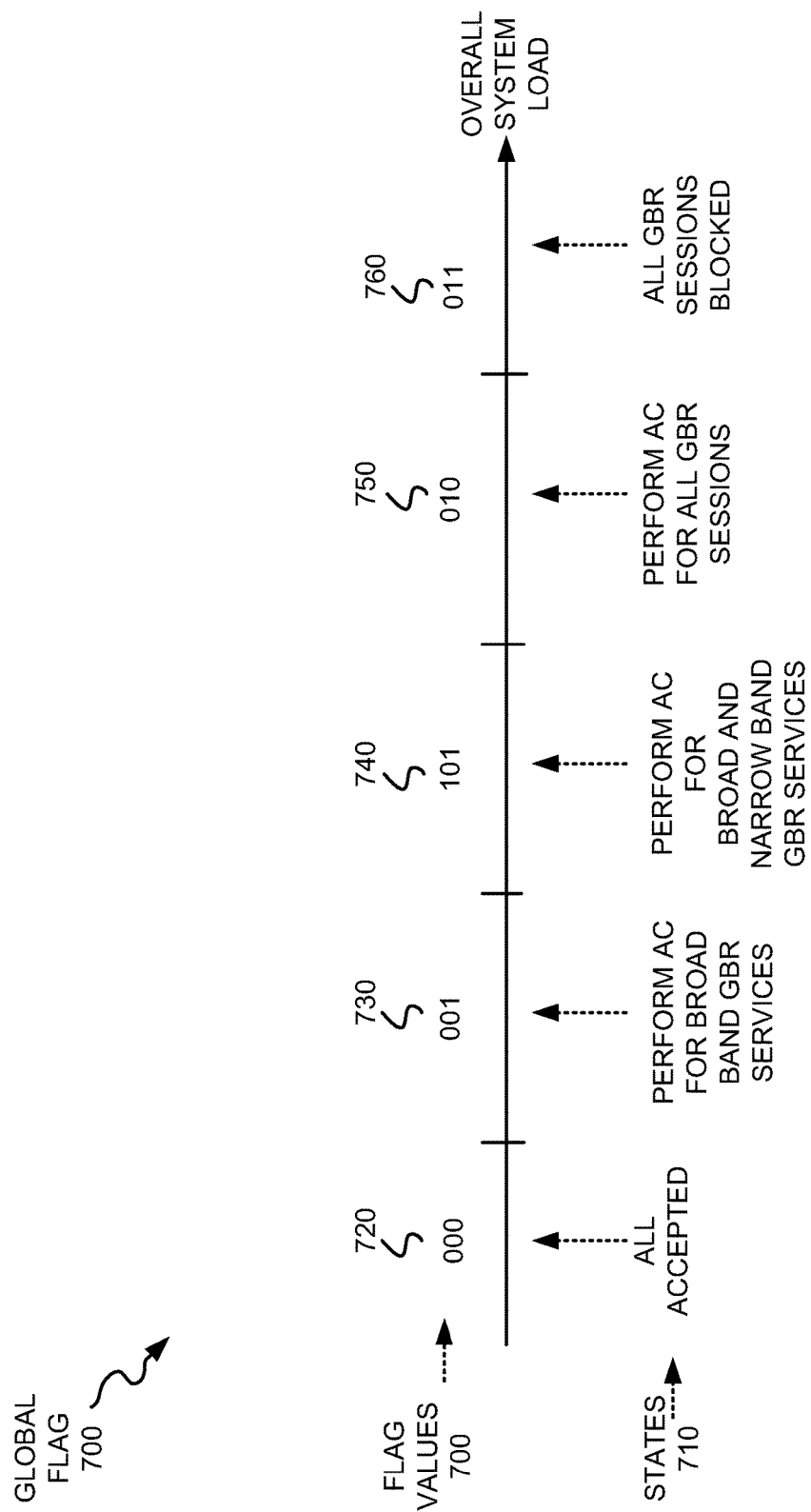
FIG. 7 depicts an exemplary global flag that may be used to indicate the overall resource availability of the multiple RATs of the network(s) of FIG. 1A.

FIG. 7 depicts an exemplary global flag 700 that may be used to indicate the overall resource availability of the multiple RATs 140-1 through 140-N of network(s) 130. A length of a global flag (e.g., global flag 700) may be chosen with respect to a number of system states defined for the multi-RAT admission control process. The set of possible system states (including the number of states) can be specified by the system operator by defining relevant overall resource thresholds and admission conditions for selected service groups. For example, narrowband service requests may be served by all RATs. The set of possible system states may be defined in terms of admission control decisions that correspond to each of the possible system states. The predefined set of overall resource availability states of the multi-RAT specified by the global flag may include one or more of the following:

a) unconditional acceptance of all services;
    b) conditional acceptance of broadband guaranteed bit rate (GBR) services and unconditional acceptance of all other services;
    c) conditional acceptance of broadband GBR services, conditional acceptance of narrowband GBR services and unconditional acceptance of all other services; or
    d) unconditional rejection of all services.

Returning to FIG. 7, exemplary global flag 700 depicts five different possible values for flag 700, each value represented by three bits, with each value corresponding to a different one of several states 710. Flag value "000" 720 corresponds to a state 710 in which all service requests are accepted. Flag value "001" 730 corresponds to a state 710 in which admission control may be performed only for broadband GBR services. Flag value "101" 740 corresponds to a state 710 in which admission control may be performed for broad and narrowband GBR services. Flag value "010" 750 corresponds to a state 750 in which admission control may be performed for all GBR sessions. Flag value "011" 760 corresponds to a state in which all GBR sessions are blocked.

The global flag (e.g., global flag 700) may be complied in the main RAT based on the load state and load information communicated by the other RATs to the main RAT. In systems where not all RATs are capable of supporting all services, or not all users can be supported by all RATs, the global flag must account for all possible combinations of RATs (i.e., subsets of RATS that can be requested in the system). The global flag may be recompiled directly upon receiving information from any of the RATs of the multi-RAT system without storing single RAT information. Alternatively, the single-RAT information can be used to maintain a corresponding local flag (one local flag may be maintained in the main RAT for every RAT of the multi-RAT system).

Alternatively, the global flag can be recompiled on request if the main RAT, in additional to the global flag, maintains a local flag for every RAT of the multi-RAT system. The local flag may then be updated every time the load information is obtained from the corresponding RAT. The global flag may be complied periodically, or after triggering by an event, based on the local flags for the RATs. The set of states represented by the local flags can be the same for all RATs. Even in this case, the same states may be defined differently in different RATs depending on the specific technologies of the different RATs. When the sets of states for the local global states coincide, the global flag can be determined as a result of the logical conjunction operation (or logical "AND") over all of the local flags.

Figure 8:
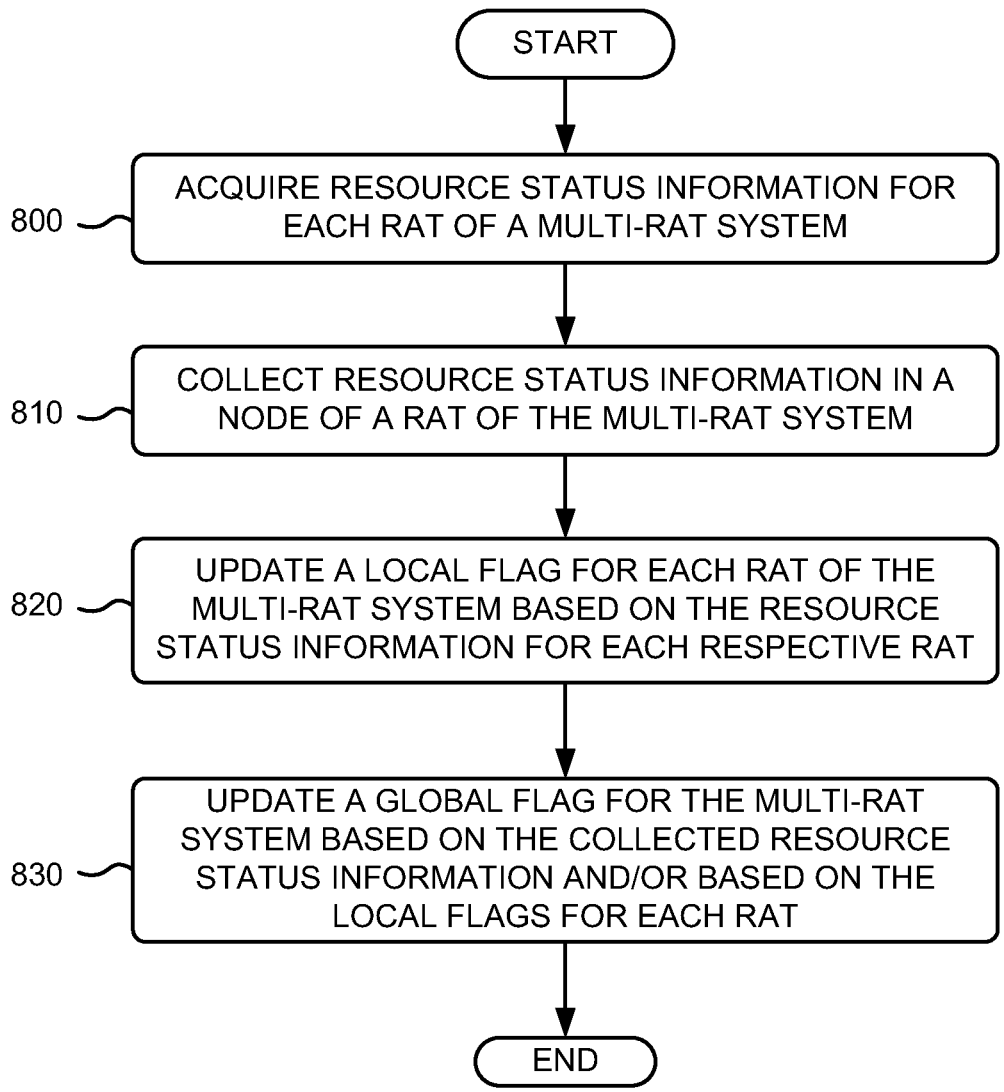
FIG. 8 is a flowchart that illustrates an exemplary process for acquiring resource status information associated with each RAT of a multi-RAT system.

FIG. 8 illustrates an exemplary process for acquiring resource status information associated with each RAT of a multi-RAT system. The exemplary process of FIG. 8 may be implemented by an eNodeB 160 of LTE RAT 140-1 in an exemplary implementation in which LTE RAT 140-1 acts as a main RAT of a multi-RAT system. In other implementations, the exemplary process of FIG. 8 may be implemented in other nodes in LTE RAT 140-1, or in other RATs of network 130 (e.g., WCDMA RAT 140-2 or GSM RAT 140-3).

The exemplary process may begin with the acquisition of resource status information for each RAT of the multi-RAT system (block 800). Resource status acquisition unit 605 may obtain resource status information associated with each of RATs 140-1 through 140-N. Such resource status information may include, for example, a total number of active sessions or calls in each RAT, a number of active radio bearers in each RAT, a number of active calls per service type in each RAT (e.g., narrow band service, broadband service, real time service, non-real time service, etc.), an aggregate number of call setup requests in each RAT, an aggregate number of call terminated messages in each RAT, a number of call setup requests per service type in each RAT, or a number of call terminated messages per service type in each RAT.

The acquired resource status information may be collected in a node of a RAT of the multi-RAT system (block 810). For example, resource status acquisition unit 605 of eNodeB 160 of LTE RAT 140-1 may collect and store the acquired resource status information in a memory. A local flag may be updated for each RAT of the multi-RAT system based on acquired resource status information for each respective RAT (block 820). Flag maintenance unit 610 may analyze the resource status information for each RAT obtained by acquisition unit 605 and may set the bits of a local flag for each respective RAT. For example, if the obtained resource status information for a given RAT indicates that the RAT is currently overloaded with traffic, then flag maintenance unit 610 may set the local flag to a value (e.g., "011") that indicates that all service requests are to be rejected.

A global flag may be updated for the multi-RAT system based on the collected resource status information and/or based on the local flags for each RAT (block 830). In one implementation, flag maintenance unit 610 may use the local flags for each of the RATs to set the bits of the global flag. In another implementation, flag maintenance unit 610 may directly analyze the resource status information for each RAT obtained by acquisition unit 605 and may set the bits of the global flag based on the resource status information. For example, referring to global flag 700 of FIG. 7, if an analysis of the resource status information indicates that all service types can currently be handled by one or more of RATs 140-1 through 140-N, then flag 700 may be set to a value of "000" 720 indicating that all service requests will be accepted.

Figure 9:
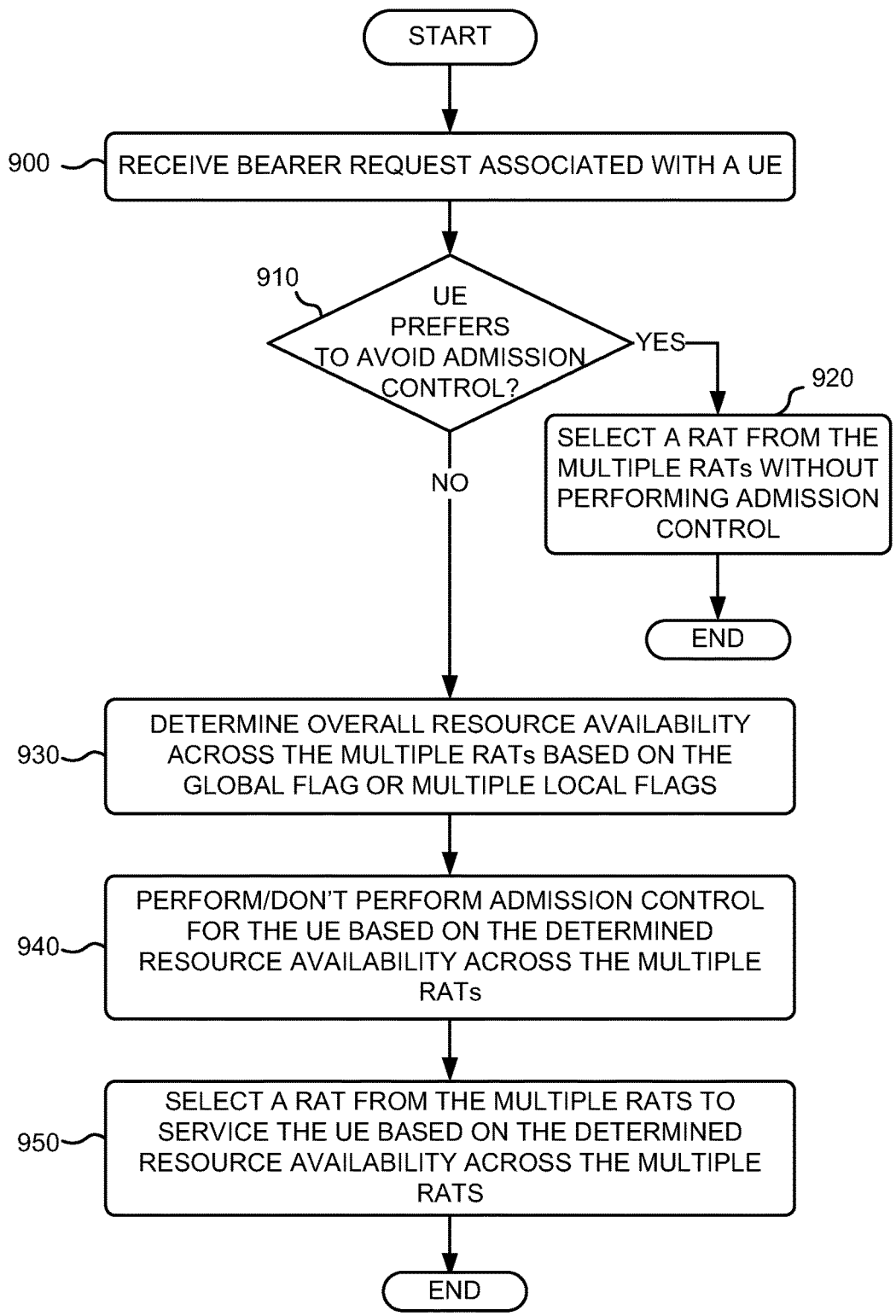
FIG. 9 is a flowchart that illustrates an exemplary process for determining overall resource availability and for performing admission control in the multi-RAT system based on the determined overall resource availability.

FIG. 9 illustrates an exemplary process for determining overall resource availability and for performing admission control in the multi-RAT system based on the determined overall resource availability. The exemplary process of FIG. 9 may be implemented by an eNodeB 160 of LTE RAT 140-1 in an exemplary implementation in which LTE RAT 140-1 acts as a main RAT of a multi-RAT system. In other implementations, the exemplary process of FIG. 9 may be implemented by other nodes in LTE RAT 140-1 or in other RATs of network 130 (e.g., WCDMA RAT 140-2 or GSM RAT 140-3).

The exemplary process may begin with the receipt of a bearer request associated with a UE (block 900). As shown in FIG. 10, a bearer request 1000 associated with an attempt to connect a call or to establish a session for UE 110 may be forwarded from a service layer via, for example, an S-GW 170 to an MME 180 associated with UE 110. Bearer request 1000 may include an admission control preference indicator and/or a RAT selection preference indicator. The AC preference indicator may indicate whether the UE prefers to go through MRAC or wants to avoid MRAC. The AC preference indicator provides flexibility to UE users in choosing whether to go through MRAC or not. The RAT selection preference indicator may indicate whether RAT selection and redirection is acceptable for the bearer request or not. System operator control over these user preferences can be implemented, for example, by means of a flexible charging policy. The AC preference indicator and the RAT selection preference indicator may be completely transparent to the UE and the user. Based on receipt of bearer request 1000, MME 180 may forward a bearer setup request 1005 to eNodeB 160 that includes the AC preference indicator and/or the RAT selection preference indicator.

A determination may be made whether the UE associated with the bearer request prefers to avoid admission control (block 910). eNodeB 160 may inspect a received bearer setup request (e.g., bearer setup request 1005) to determine if the AC preference indicator indicates that the corresponding UE prefers to avoid admission control. If so (YES—block 910), then a RAT may be selected from the multiple RATs without performing admission control (block 920). If eNodeB 160's inspection of the AC preference indicator identifies that the UE prefers to avoid admission control then, in one exemplary embodiment, the UE may be granted access without performing admission control. In another exemplary embodiment, if eNodeB 160's inspection of the AC preference indicator identifies that the UE prefers to avoid admission control, then eNodeB 160 may inspect the RAT selection preference indicator to identify if RAT re-selection is acceptable for this UE. If RAT re-selection is acceptable, then eNodeB 160 may select any of RATs 140-1 through 140-N for handling the call/session request from the UE. If, according to the RAT selection preference indicator, RAT re-selection is unacceptable for this UE, then a default RAT may be selected for the UE. FIG. 10 depicts bearer setup request 1005 being received at eNodeB 160. eNodeB 160 may inspect the AC preference indicator and RAT selection preference from the bearer setup request 1005 to determine if the UE prefers to avoid admission control. If the AC preference indicator identifies that the UE prefers to avoid admission control, eNodeB 160 may skip MRAC 1010 and may continue the access granting process by sending a radio bearer setup message 1015 to UE 110.

If the UE does not prefer to avoid admission control (NO—block 910), then an overall resource availability may be determined across the multiple RATs based on the global flag or multiple local flags (block 930). eNodeB 160 may inspect the AC preference indicator to identify whether the UE prefers to not avoid admission control. If the AC preference indicator indicates that the UE does not prefer to avoid admission control, then resource availability evaluator 630 of eNodeB 160 may retrieve the global flag or multiple local flags from flag database 620. By inspecting the bit values of the retrieved global flag, resource availability evaluator 630 may identify the resource availability states of the multi-RAT system in terms of admission control decisions. For example, if global flag 700 indicates a value of "001" 730, then resource availability evaluator 630 may determine that admission control should be performed for service requests associated with broadband GBR services.

Admission control may be selectively performed or not performed for the UE based on the determined resource availability across the multiple RATs (block 940). A number of admission control actions may be performed based on the resource availability identified by the global flag (or local flags). The admission control actions identified by inspection of the global flag may include, but are not limited to, the following:

a) unconditional acceptance of all services;
b) conditional acceptance of broadband guaranteed bit rate (GBR) services and unconditional acceptance of all other services;
c) conditional acceptance of broadband GBR services, conditional acceptance of narrowband GBR services and unconditional acceptance of all other services; or
d) unconditional rejection of all services.

A RAT may be selected from the multiple RATs to service the UE based on the determined resource availability across the multiple RATs (block 950). eNodeB 160 may inspect the RAT selection preference indicator to identify if RAT re-selection is acceptable for this UE. If RAT re-selection is acceptable, then eNodeB 160 may select any of RATs 140-1 through 140-N for handling the call/session request from the UE based on the content of the call/session request (e.g., bearer setup request) and based on the determined resource availability. If, according to the RAT selection preference indicator, RAT re-selection is unacceptable for this UE, then a default RAT may be selected for the UE. FIG. 10 depicts bearer setup request 1005 being received at eNodeB 160. eNodeB 160 may inspect the RAT selection preference from the bearer setup request 1005 and may continue the access granting process by sending a radio bearer setup message 1015 to the UE 110. As further shown in FIG. 10, eNodeB 160 and UE 110 may engage in radio bearer setup establishment 1020. Subsequent to the radio bearer establishment 1020, UE 110 may return a radio bearer setup response 1025 to eNodeB 160 acknowledging establishment of the radio bearer setup. In turn, eNodeB 160 may return a bearer setup response message 1030 to MME 180 acknowledging radio bearer setup. MME 180 may further send a bearer response message 1035 via a service layer to, for example, the appropriate S-GW 170.

The foregoing description of implementations provides illustration and description, but is not intended to be exhaustive or to limit the present disclosure to the precise form disclosed. Modifications and variations are possible in light of the above teachings, or may be acquired from practice of the present disclosure. For example, while a series of blocks has been described with regard to FIGS. 8 and 9, the order of the blocks may be modified in other implementations consistent with the principles of the present disclosure. Further, non-dependent blocks may be performed in parallel. While exemplary embodiments have been described herein with respect to a multi-frequency multi-RAT system (MFM-RAT), the exemplary embodiments may be applied in multi-frequency and single frequency multi-RAT systems and in multi-frequency single-RAT systems. In examples described herein, an LTE system was assumed to be a main RAT of the multi-RAT system. However, any RAT in network(s) 130 may be implemented as the main RAT of the multi-RAT system and can, therefore, exercise the proposed MRAC scheme on behalf of the entire system. The use of cross-layer communication for obtaining resource status information and the global flag for maintaining resource status information may also be adapted for use in load balancing in addition to, or instead of, multi-RAT admission control.

Aspects of the present disclosure may also be implemented in methods and/or computer program products. Accordingly, the present disclosure may be embodied in hardware and/or in software (including firmware, resident software, microcode, etc.). Furthermore, the present disclosure may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the present disclosure. Thus, the operation and behavior of the embodiments were described without reference to the specific software code—it being understood that one of ordinary skill in the art would be able to design software and control hardware to implement the aspects based on the description herein.

Furthermore, certain portions of the present disclosure may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the present disclosure. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the present disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented in a node of a multiple radio access technology (multi-RAT) system, comprising:
    acquiring resource status information associated with each RAT of the multi-RAT system; and
    maintaining an N-bit global flag representing an overall resource availability of the multi-RAT system, based on the acquired resource status information, for use in admission control;
    wherein the N-bit global flag is encoded such that none of its N bits describes any of the multiple RATs individually.

2. The method of claim 1, wherein the global flag is associated with a pre-defined set of overall resource availability states of the multi-RAT system, and wherein the availability states are defined in terms of admission control decisions.

3. The method of claim 1, wherein each of the RATs of the multi-RAT system comprises multi-frequency or single frequency RAT systems.

4. The method of claim 1, where the multi-RAT system includes two or more of an evolved Universal Mobile Telecommunications System Terrestrial Access Network (E-UTRAN) Frequency Division Duplexing (FDD) system, a E-UTRAN Time Divisional Duplexing (TDD) system, a Wide Band Code Division Multiple Access (WCDMA) system, an advanced E-UTRAN TDD system, an advanced E-UTRAN FDD system, a UTRAN TDD system, a high rate packet data (HRPD) system, a Global System for Mobile Communications (GSM) system, and a cdma2000 system.

5. The method of claim 1, wherein portions of each of the RATs of the multi-RAT system are deployed in multiple, co-located base stations.

6. The method of claim 1, wherein portions of each of the RATs of the multi-RAT system are deployed in a single base station.

7. A node in a multiple radio access technology (multi-RAT) system, comprising processing circuitry configured to:
acquire resource status information associated with each RAT of the multi-RAT system;
maintain an N-bit global flag representing an overall resource availability of the multi-RAT system based on the acquired resource status information, for use in admission control; and
determine whether or not to perform admission control for a system access request based on the overall resource availability represented by the global flag;
wherein the N-bit global flag is encoded such that none of its N bits describes any of the multiple RATs individually.

8. The node of claim 7, wherein the global flag is associated with a pre-defined set of overall resource availability states of the multi-RAT system, and wherein the availability states are defined in terms of admission control decisions.

9. The node of claim 7, wherein the multi-RAT system includes two or more of an evolved Universal Mobile Telecommunications System Terrestrial Access Network (E-UTRAN) Frequency Division Duplexing (FDD) system, a E-UTRAN Time Divisional Duplexing (TDD) system, a Wide Band Code Division Multiple Access (WCDMA) system, an advanced E-UTRAN TDD system, an advanced E-UTRAN FDD system, a UTRAN TDD system, a high rate packet data (HRPD) system, a Global System for Mobile Communications (GSM) system, and a cdma2000 system.

10. The node of claim 7, wherein the multi-RAT system includes a multi-frequency RAT and a single frequency RAT.

* * * * *

UNITED STATES PATENT AND TRADEMARK OFFICE
CERTIFICATE OF CORRECTION

PATENT NO. : 10,237,816 B2  
APPLICATION NO. : 14/546848  
DATED : March 19, 2019  
INVENTOR(S) : Fodor et al.

Page 1 of 1

It is certified that error appears in the above-identified patent and that said Letters Patent is hereby corrected as shown below:

On the Title Page

Item (73), under "Assignee", in Column 1, Lines 1-2, delete "TELEFONAKTIEBOLAGET LM ERICSSON ( PUBL)," and insert -- TELEFONAKTIEBOLAGET LM ERICSSON (PUBL), --, therefor.

In the Specification

In Column 1, Line 8, delete "2011," and insert -- 2011, now Pat. No. 9,008,671, --, therefor.

In Column 1, Lines 23-24, delete "Global Standard for Mobile (GSM) communications," and insert -- Global System for Mobile Communications (GSM), --, therefor.

In Column 1, Lines 25-26, delete "Enhanced Data for GSM Evolution (EDGE)," and insert -- Enhanced Data rates for GSM Evolution (EDGE), --, therefor.

In Column 5, Line 22, delete "Terrestrial Access" and insert -- Terrestrial Radio Access --, therefor.

In Column 6, Line 66, delete "LTE RAT 240," and insert -- LTE RAT 250, --, therefor.

In the Claims

In Column 14, Line 60, in Claim 4, delete "Terrestrial Access" and insert -- Terrestrial Radio Access --, therefor.

In Column 16, Line 8, in Claim 9, delete "Terrestrial Access" and insert -- Terrestrial Radio Access --, therefor.

Signed and Sealed this  
Twenty-fifth Day of June, 2019

Andrei Iancu  
*Director of the United States Patent and Trademark Office*